(12) United States Patent  
Grünbacher et al.

(10) Patent No.: US 8,770,019 B2  
(45) Date of Patent: Jul. 8, 2014

(54) TEST RIG FOR DYNAMIC TEST ASSIGNMENTS ON INTERNAL COMBUSTION ENGINES, AND METHOD FOR OPERATING A TEST RIG OF THIS KIND

(75) Inventors: Engelbert Grünbacher, Vöcklabruck (AT); Helmut Kokal, Graz (AT); Martin Schmidt, Langen (DE); Luigi Del Re, Linz (AT); Michael Paulweber, Hausmannstätten (AT)

(73) Assignee: AVL List GmbH, Graz (AT)

( * ) Notice: Subject to any disclaimer, the term of this patent is extended or adjusted under 35 U.S.C. 154(b) by 29 days.

(21) Appl. No.: 13/464,519

(22) Filed: May 4, 2012

(65) Prior Publication Data

US 2012/0285228 A1 Nov. 15, 2012

(30) Foreign Application Priority Data

May 9, 2011 (AT) .................................. A 644/2011

(51) Int. Cl.  
*G01M 15/04* (2006.01)

(52) U.S. Cl.  
USPC ....................................................... 73/116.05

(58) Field of Classification Search  
USPC ....................................................... 73/116.05  
See application file for complete search history.

(56) References Cited

U.S. PATENT DOCUMENTS

| 4,995,139 A * | 2/1991 | Suzuki ....................... 73/116.05 |
| 6,768,940 B2 * | 7/2004 | Akiyama et al. ............... 701/114 |
| 6,775,610 B2 * | 8/2004 | Akiyama et al. ............... 701/114 |
| 7,770,440 B2 * | 8/2010 | Langthaler et al. ......... 73/115.05 |
| 8,006,548 B2 * | 8/2011 | Akiyama et al. ........... 73/116.05 |
| 8,245,570 B2 * | 8/2012 | Pickl et al. .................. 73/116.01 |
| 2011/0238359 A1 * | 9/2011 | Kokal et al. .................... 702/113 |

FOREIGN PATENT DOCUMENTS

| JP | 2005292014 | 10/2005 |
| WO | 2010004870 | 1/2010 |

OTHER PUBLICATIONS

G. Huamin, "Design of a Multivariable Controller for an Engine," Int. Conference on Computer, Mechatronics, Control and Electronic Engineering (CMCE), Aug. 2010, pp. 476-479.  
English Abstract of JP 2005-292014.

* cited by examiner

*Primary Examiner* — Freddie Kirkland, III  
(74) *Attorney, Agent, or Firm* — Dykema Gossett PLLC

(57) ABSTRACT

A test rig for dynamic test assignments on internal combustion engines is equipped with a preferably electrical drive and/or loading device which is coupled to a control device for adapting and controlling setpoint values for a speed and a torque characteristic. For a test rig of this kind, in order to enable the setpoint values determined by a speed and a torque characteristic to be optimally adapted and controlled for the respective test assignment and so that they can be reproduced on the test rig in the best possible manner, the control device can be adapted in terms of adjusting the weighting of speed control to torque control.

9 Claims, 2 Drawing Sheets

TEST RIG FOR DYNAMIC TEST ASSIGNMENTS ON INTERNAL COMBUSTION ENGINES, AND METHOD FOR OPERATING A TEST RIG OF THIS KIND

BACKGROUND OF THE INVENTION

1. Field of the Invention

The invention relates to a test rig for dynamic test assignments on internal combustion engines having a preferably electrical drive and/or loading device which is coupled to a control device for adapting and controlling setpoint values for a speed and a torque characteristic, and a method for operating a test rig with at least one drive and/or loading unit for dynamic test assignments on internal combustion engines, with which setpoint values for the characteristic of at least two variables of the combustion engine, preferably a speed and a torque, are adjusted by means of a drive and or/or loading unit.

2. The Prior Art

A highly dynamic and modern control device of a dynamic engine test rig allows any specified characteristic of speed and torque to be followed almost perfectly. However, this is only possible when the adjustable power of the machines, i.e. of the internal combustion engine and the power brake, is sufficient. In each case, however, this is limited, which leads to a curtailment of the possible characteristics. As two machines are provided on the test rig, two output variables can be controlled. As a rule, these are a speed and a torque. The speed can be the speed of the power brake or the speed of the internal combustion engine. The torque means either the torque of the internal combustion engine which is output at the crankshaft, or the shaft torque or load torque. If characteristics of these variables which the control can no longer achieve due to the limited adjustable power are now specified, then these characteristics must be changed so that they can once again be realized on the test rig.

When the manipulated variables on the test rig are limited, the feedback control can lead to a "wind up" effect. This effect can be recognized by increased overshoot or even a strong tendency of the closed control loop to oscillate and it leads to a loss of controller performance. For this reason, anti-wind-up structures, which are intended to prevent this "wind up" effect, are introduced. These additions to the controller have been in use for a long time.

The object of the present invention was therefore to provide a test rig and a method for its operation with which the setpoint values determined by a speed and a torque characteristic can be optimally adapted and controlled for the respective test assignment so that they can be reproduced on the test rig in the best possible manner.

SUMMARY OF THE INVENTION

To achieve this object, according to the invention, the test rig is characterized in that the control device can be adapted in terms of adjusting the weighting of speed control to torque control.

Advantageously, to this end, the control device is connected to a control element for adjusting the weighting.

According to a preferred embodiment, it is provided that the control element is realized by means of a graphical user interface.

A further embodiment of the invention provides that the control device can be modified in terms of a stepless adjustment of the weighting.

In order to achieve the object described in the introduction, the method is characterized in that the control device divides the available control power between the internal combustion engine and the drive and/or loading unit in accordance with a specifiable and variable weighting.

At the same time, it is advantageously provided that, in the event of a control demand which exceeds the power reserves of a machine, the power reserves of a machine which is working at its power limits are used to support the other machine in accordance with the specifiable and variable weighting.

According to a preferred variant of the method, it is provided that the reaching of the power limits of the machines is monitored and before these power limits are exceeded the setpoint values for at least one of the variables are modified in such a way that both machines remain within the power limits.

It can, of course, also be provided that both setpoint values are modified in such a way that the control device divides the available control power in accordance with the specified weighting.

Advantageously, in addition to adapting the desired characteristics, the manipulated variables which are necessary for an exact tracking of these modified characteristics are also automatically calculated at the same time.

Furthermore, according to a particularly advantageous variant of the invention, an anti-wind-up structure, with which the feedback of the difference between the value output by the controller and the permissible value is used to divide the control power between the internal combustion engine and the drive and/or loading unit in accordance with the specifiable and variable weighting, is provided.

The invention is explained in more detail in the following description with reference to the attached diagrams.

DETAILED DESCRIPTION OF THE PREFERRED EMBODIMENTS

On a test rig, at least one load machine is provided, usually an asynchronous machine which is supplied by a frequency converter and is coupled to the internal combustion engine under test by means of an elastic shaft. Input variables on the drive side are the gas pedal and on the load side the (positive or negative) load torque setpoint of the electrical machine. The combination of the two resulting torques then sets the effective speed via the inertias and resistances.

The engine is now to be run on the test rig at the required working point, wherein this working point is in most cases expressed by a combination of speed and engine torque. At the same time, the dynamics and accuracy when setting up a working point are particularly important. A measure of these dynamics and accuracy is the performance, which is defined as the reciprocal mean square deviation between the reference signal and the actual value of the reference variable, which is also scaled to the standard performance. Here, the standard performance is the reciprocal mean square deviation between the reference signal and the actual value of the reference variable which can be achieved with the test rig configuration used.

The main factors which are definitive of the performance of the measurement are the frequency distribution of the speed and torque references to be tracked, the dynamic limits of the internal combustion engine, the limitations of the test rig hardware, that is to say mainly the braking machine and the transmission shaft, and the utilization of these limits, for which the test rig control is mainly responsible. As the setpoints for the speed and torque characteristic can be chosen at will, it is not always immediately clear whether they can be implemented with the required accuracy with the particular test setup. However, it is important that the machines are operated within the performance limits during the tests, otherwise the test can be misleading or it can give the impression that the test rig controller is not working correctly.

When a working point is to be changed in as short a time as possible, that is to say utilizing the performance limits of both machines, there are essentially two extremes. The speed characteristic can be reproduced exactly, for which both machines must drive in the same direction with maximum torque (i.e. at the performance limits), as a result of which the torque can no longer be controlled. Or the torque characteristic can be reproduced accurately and the respective torque can be adjusted very quickly by a torsion of the shaft which is determined by the development of the speed difference. In order that it remains correct, the speeds of both machines must therefore increase in a coordinated manner, wherein here the slower engine acts as a restriction.

Figure 1:
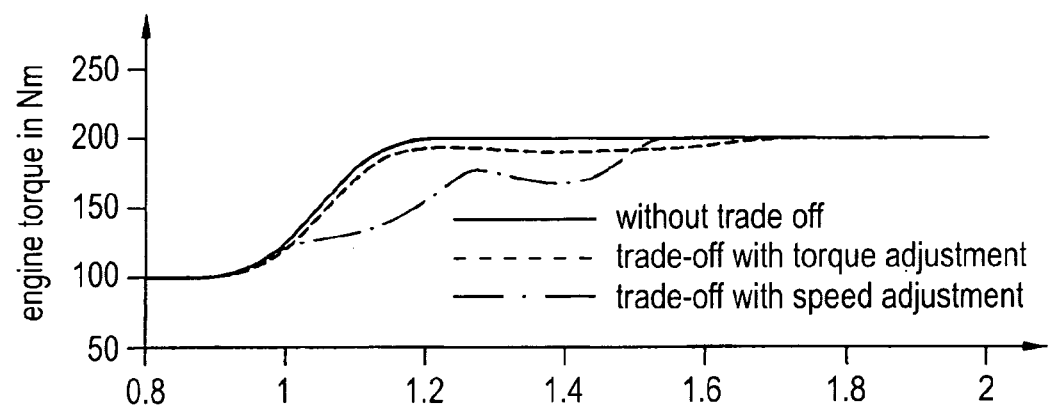
FIG. 1 shows two diagrams of a working point change outside the power limits of the test rig arrangement.
Figure 1:
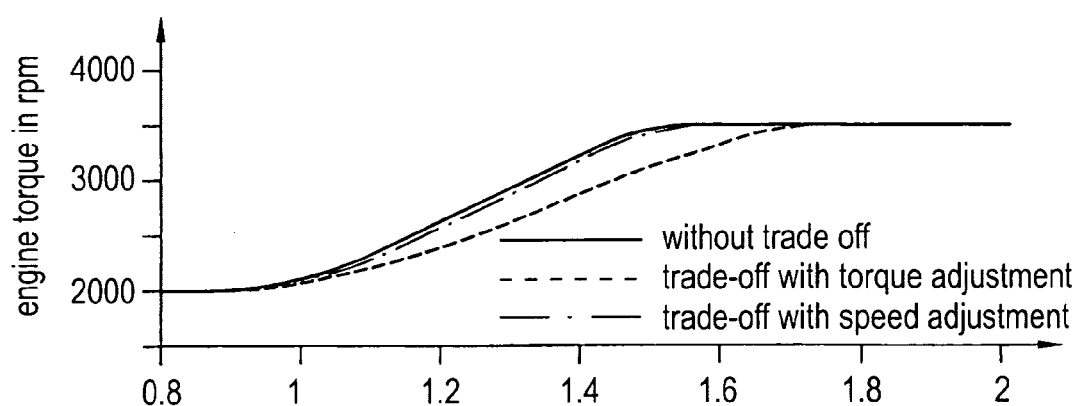

A working point change and the two extreme cases are shown in FIG. 1. The continuous line is the required characteristic, which however is not achievable, mainly because the engine is too slow. Because the engine is at the limit, the number of degrees of freedom is reduced. The faster power brake is now unable to correct both variables simultaneously.

However, with a control device which can be adapted in terms of adjusting the weighting of speed control to torque control, the weighting between the two variables can now be changed. For a speed-oriented control, the reserve of the power brake is used to follow the specified speed as closely as possible. This is at the expense of the actual torque characteristic, as the chain dotted line in FIG. 1 shows. In the same way, however, the reserve of the power brake can also be used to control the torque as closely as possible, which is at the expense of the speed control, as the dashed characteristic shows. Preferably, the weighting can be adjusted steplessly, but could also take place in fixed specified steps, for which purpose the control device is equipped with a control element for adjusting the weighting. This control element can, of course, also be realized by means of a graphical user interface, for example displayed as a slide controller, with which the weighting of speed control to torque control can be steplessly adjusted. In addition to adapting the desired characteristics, the manipulated variables which are necessary for an exact tracking of these modified characteristics are preferably also automatically calculated at the same time.

Figure 2:
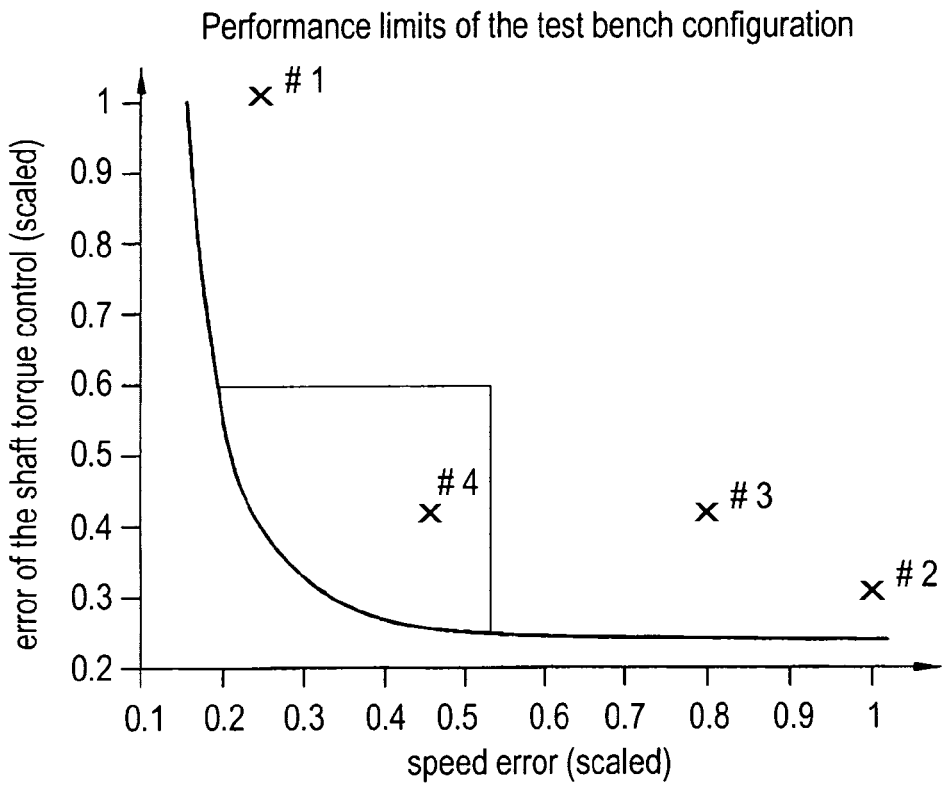
FIG. 2 is a diagram for characterizing the controller performance.

The line shown in FIG. 2 shows the best achievable controller performance for the working point change shown in FIG. 1. Depending on the position of the control element for adjusting the weighting, a point on the gray line can be achieved, i.e. either the torque error is small, the speed error is small or a mixed value is achieved. Preferably, the performance limits of the test rig are automatically calculated after carrying out an off-line identification.

A feedback element ensures the necessary robustness and stability for the control of the test rig, wherein this feedback element is preferably calculated automatically and is matched to the weighting of the slide controller. As a result of limiting the manipulated variable on the test rig as described above, the feedback control can result in a "wind up" effect which manifests itself by increased overshooting and also by a strong tendency of the closed control loop to oscillate and leads to a loss of controller performance. So-called anti-wind-up structures are therefore available as additions to the controller. Internal coupling terms of the inputs, e.g. gas pedal for the internal combustion engine and the set torque for the power brake, lead to one input affecting both outputs of the system, i.e. as an example both the speed of the internal combustion engine or the power brake and the torque of the internal combustion engine at the crankshaft or the shaft torque (load torque) are affected.

Figure 3:
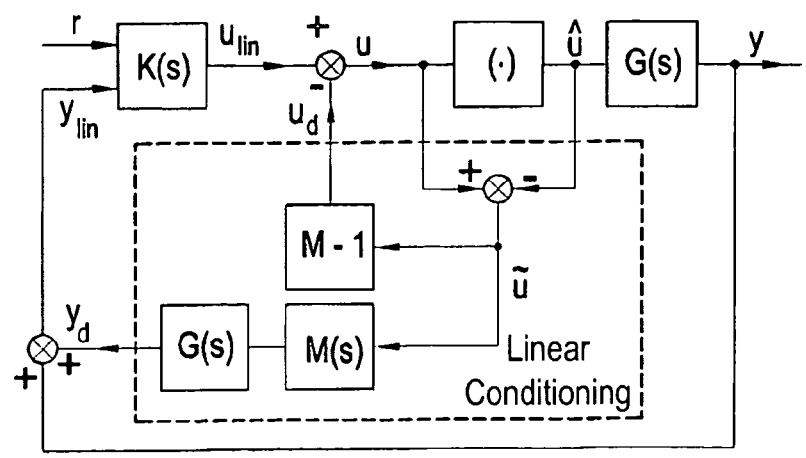
FIG. 3 is a schematic representation of a control arrangement for a test rig with anti wind-up structure.

However, with an "anti-wind-up" control, this coupling can also be used intelligently. A possible "anti-wind-up" structure is shown schematically in FIG. 3 where the limited manipulated variable is designated by û. An important characteristic of this structure is the feedback of the difference between the value output by the controller and the permitted value. The exact design of the part inside the dashed box is now important for the behavior of the control loop in the event of manipulated variable restrictions.

This part is designed in such a way that, in the event of a limitation of one input, the other is used in order to guarantee the performance accordingly, even in the limited case. It is therefore possible to use an input which has not yet been limited to support the other. Non-limited manipulated variables are therefore used to maintain the controller performance. This process can also be adjusted steplessly by means of an adjusting knob or by software via a GUI. By limiting one input, it may be that the performance is shifted from one control variable to another, which was not desirable in the original control loop without restrictions. The anti-wind-up structure is now intended to enable the albeit reduced performance in the limited case to be shifted back to the original control variable according to the weighting. Preferably the algorithm provided for this is calculated and set up automatically after a short identification.

An automatically generated warning signal for the test rig operator if he specifies characteristics which cannot be implemented by the test rig configuration and are therefore possibly not realistic is particularly advantageous. At the same time, in addition to the warning signal, information can also be displayed as to which machine is working at the limit.

The invention claimed is:

1. A test rig for dynamic test assignments on internal combustion engines comprising an electrical drive and/or loading device, a control device to which the electrical drive and/or loading device is connected for adapting and controlling setpoint values for a speed and a torque characteristic, and a control element to which the control device is connected for adjusting the weighting of speed control to torque control.

2. The test rig as claimed in claim 1, wherein the control element comprises a graphical user interface.

3. A method for operating a test rig having at least one drive and/or loading unit for dynamic test assignments on an internal combustion engine, a drive and/or loading unit for controlling setpoint values for the characteristic of a least two variables of the internal combustion engine, comprising the step of utilizing a control device for dividing available control power between the internal combustion engine and the drive and/or loading unit in accordance with a specifiable and variable weighting.

4. The method as claimed in claim 3, wherein in the event of a control demand which exceeds power reserves of the internal combustion engine, using power reserves of the drive and/or loading unit which is working at its power limits to support the internal combustion engine in accordance with the specifiable and variable weighting.

5. The method as claimed in claim 3, comprising monitoring power limits of the internal combustion engine, and before these power limits are exceeded, modifying the setpoint values for at least one of the variables in such a way that the internal combustion engine and the drive and/or loading unit remain within the power limits.

6. The method as claimed in claim 3, comprising modifying both setpoint values in such a way that the control device divides the available control power in accordance with the specified weighting.

7. The method as claimed in claim 6, wherein in addition to adapting desired values, the control values which are necessary for an exact tracking of these modified values are also automatically calculated at the same time.

8. The method as claimed in claim 7, using an anti-wind-up structure, with which feedback of a difference between the control point by the controller and a permissible value of the internal combustion engine, to divide the control power between the internal combustion engine and the drive and/or loading unit in accordance with the specifiable and variable weighting.

9. The method as claimed in claim 3, wherein said at least two variables comprise speed and torque.

\* \* \* \* \*